US005551765A

United States Patent [19]
Sich

[11] Patent Number: 5,551,765
[45] Date of Patent: Sep. 3, 1996

[54] ELECTRIC BRAKE CONTROL SYSTEM AND METHOD FOR RAILROAD CAR

[75] Inventor: Gary M. Sich, Irwin, Pa.

[73] Assignee: Westinghouse Air Brake Company, Wilmerding, Pa.

[21] Appl. No.: 493,606

[22] Filed: Jun. 22, 1995

[51] Int. Cl.⁶ ..................................................... G60T 13/00
[52] U.S. Cl. .................................................. 303/7; 303/20
[58] Field of Search ................................. 303/7, 9, 9.66, 303/9.69, 20, 22.6

[56] References Cited

U.S. PATENT DOCUMENTS 4,188,070  2/1980  Grenier ........................................ 303/3
4,402,047  8/1983  Newton et al. ............................ 303/3 X
5,080,445  1/1992  Brearley et al. ............................ 303/7

Primary Examiner—Josie Ballato
Attorney, Agent, or Firm—Gary J. Falce

[57] ABSTRACT

A microprocessor based brake control system for a railroad car, wherein the car brake cylinder pressure is regulated in accordance with the specific design net braking ratio of the car and the actual car load weight in order to achieve consistent levels of retardation on the cars throughout the length of a train irrespective of such variables as design net braking ratio that otherwise influence car retardation. The actual level of retardation is increased on partially loaded or empty cars so that those cars share in the braking of a train. This is especially useful during grade braking.

22 Claims, 5 Drawing Sheets

ELECTRIC BRAKE CONTROL SYSTEM AND METHOD FOR RAILROAD CAR

BACKGROUND OF THE INVENTION

The present invention is related to railroad car brake control systems and particularly to microprocessor based electro-pneumatic brake control systems suitable for freight type railroad service.

In the braking of a freight train, consideration must be given to in-train forces, in order to limit damage to lading and to optimize wheel/rail engagement. Such in-train forces typically occur due to non-uniform braking effort between the respective cars of a train. This non-uniform braking effort can be attributed to such variable factors as influence retardation, including brake cylinder pressure buildup times, brake equipment design, and car loading. For the most part, the difference in brake cylinder pressure buildup times is due to the rate at which the pneumatic brake signal is propagated through the train brake pipe. Since electric signal transmission can be achieved near instantaneously, by employing either radio or hard wire means, such electric brake signal can initiate braking simultaneously and therefore eliminate the difference in brake cylinder pressure buildup times throughout a train of cars.

While this can provide improvement in reducing in-train forces, further improvement could be realized if differences in brake equipment design and car weight could be accounted for. Currently, the Association of American Railroads mandates that the brake rigging of railroad cars be designed to achieve a net braking ratio of between 6.5 and 10 percent when a car is loaded at its designed full load capacity and is braked at 50 psi brake cylinder pressure, which generally corresponds to a full service application with a 70 psi charged brake pipe. The conventional pneumatic brake equipment does not have the ability to distinguish between cars having these different designed net braking ratios. Therefore, except for a two-step empty/load brake control, which is only effective when a car is in an "empty" load range, no other adjustment of the developed brake cylinder pressure is provided for. Accordingly, different levels of retardation occur throughout a train of cars having different design net braking ratios and/or different load weights within the "load" range of car load. Owing to the length of modern day freight trains, such unequal levels of retardation constitute a major factor in the source of in-train forces.

The designed net braking ratio of a freight car is determined when the car is built, being based on the formula:

$$NBR = \frac{\text{Measured SHOE FORCE}}{\text{Loaded Car Weight}}$$

or $$NBR = \frac{PLANE}{W}$$

where:
P=brake cylinder pressure
L=lever ratio
A=piston area of brake cylinder
N=number of brake cylinders
E=efficiency
W=car weight It will be seen from the foregoing that assuming a constant efficiency factor and given car weight, the only variable in this formula is brake cylinder pressure. Therefore, varying brake cylinder pressure changes the effective net braking ratio of the car. In determining a car's designed net braking ratio, a predetermined brake cylinder pressure is used in the foregoing calculation, generally 50 psi.

SUMMARY OF THE INVENTION

The object of the present invention, therefore, is to regulate the effective brake cylinder pressure on railroad cars in accordance with the car's design net braking ratio, so as to achieve corresponding levels of car retardation. These corresponding levels of car retardation are gradually increased from a $NBR_{FSL}$ value up to a $NBR_{FSE}$ value depending on car weight. This allows partially loaded or empty cars to share in the braking of the train during grade braking.

It is another object of the invention to further regulate the effective brake cylinder pressure of a railroad car in accordance with its actual operating weight over the full range between empty and full load.

Still another object of the invention is to provide an emergency brake cylinder pressure that is greater than the regulated brake cylinder pressure by a predetermined percentage.

Briefly these objectives are achieved by means of a microprocessor based brake control system for a railroad car, the microprocessor of which comprises means for providing a brake pressure signal that varies from a predetermined value, on which the railroad car design net braking ratio is based, an amount determined by the ratio between a net brake ratio command signal issued from the locomotive and the designed net braking ratio of the car.

BRIEF EXPLANATION OF THE DRAWINGS

These and other objects and advantages of the invention will become apparent from the following more detailed explanation when taken in conjunction with the accompanying drawings in which.

DESCRIPTION AND OPERATION

Figure 1:
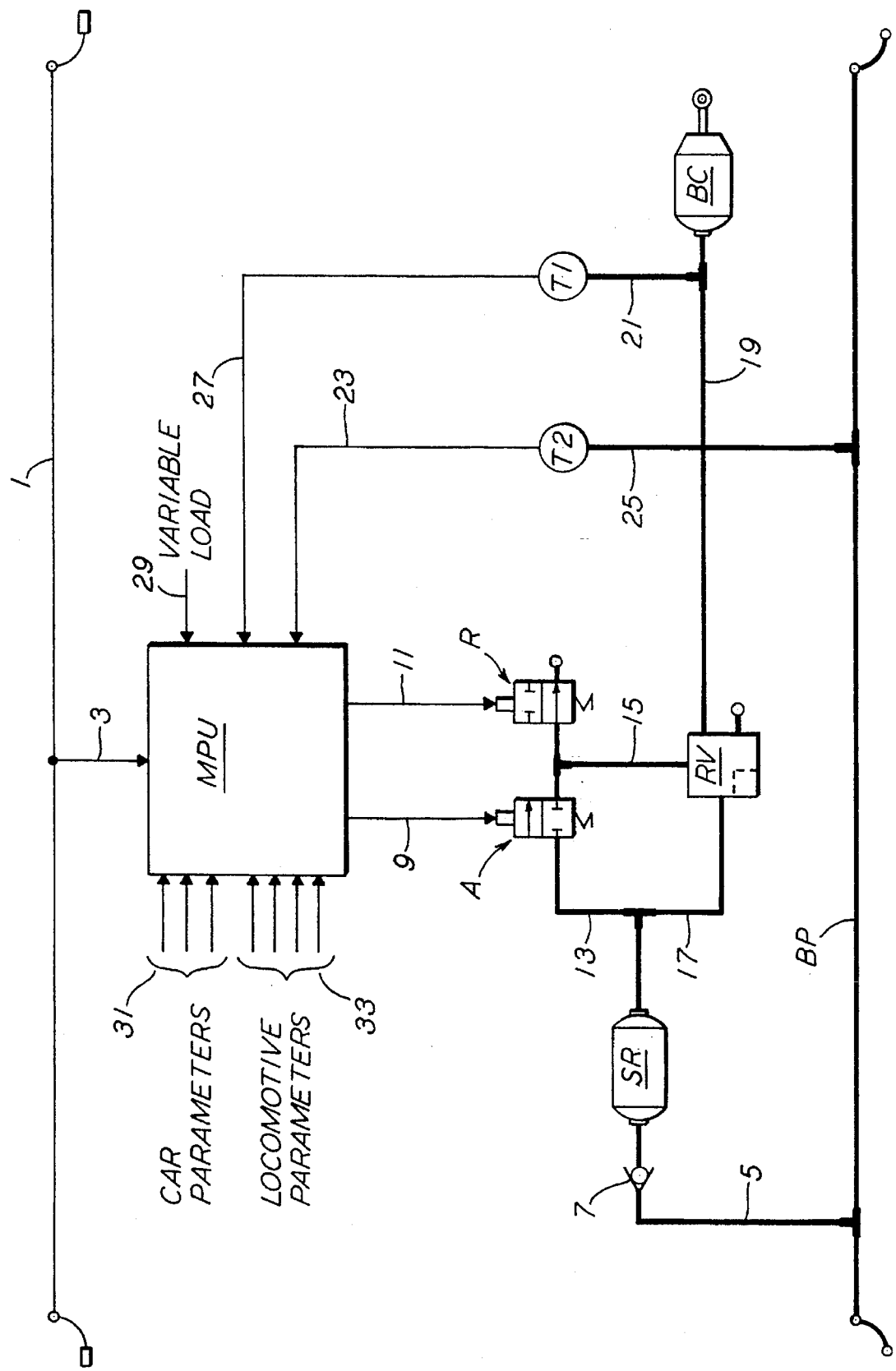
FIG. 1 is a diagrammatic view of a microprocessor based railroad car brake system in accordance with the present invention.

Referring to FIG. 1 of the drawings, a railroad car brake control system according to the present invention includes a microprocessor unit MPU to which a trainline wire 1 is connected via a branch wire 3, an application electro-magnet valve A, a release electro-magnet valve R, a relay valve RV, such as a commonly known J-type relay valve manufactured by the Westinghouse Air Brake Co., a brake cylinder BC, and a supply reservoir SR to which a trainline brake pipe BP is connected via a branch pipe 5 and a one-way check valve 7 to maintain supply reservoir SR charged to the pressure carried in brake pipe BP. Application electro-magnet valve A and release electro-magnet valve R are controlled by microprocessor unit MPU via wires 9 and 11. Application electro-magnet valve A is a normally closed, two-position, two-way, solenoid operated valve having a spring return, while release electro-magnet valve R is a normally open, two-position, two-way, solenoid operated valve having a spring return. The inlet port of application electro-magnet valve A is connected by a pipe 13 to supply reservoir SR, and the outlet port is connected by a pipe 15 to the control port of relay valve RV and to the inlet port of release electro-magnet valve R. The outlet port of release electro-magnet valve R is vented to atmosphere. The supply port of relay valve RV is connected by a pipe 17 to supply reservoir SR, a delivery port is connected by a pipe 19 to brake cylinder BC, and an exhaust port is vented to atmosphere. A pressure to electric transducer T1 is connected by a pipe 21 to pipe 19 and by a wire 23 to microprocessor unit MPU. Another pressure to electric transducer T2 is connected by a pipe 25 to brake pipe BP and by a wire 27 to microprocessor unit MPU. A wire 29 connects a load signal to microprocessor unit MPU that varies according to the car weight under all conditions of car loading between empty and full. Additional signals 31 corresponding to specific car parameters, as hereinafter discussed, and signals 33 corresponding to specific locomotive parameters, also discussed hereinafter, are connected to microprocessor unit MPU.

When a brake application is called for, microprocessor unit MPU energizes, wires 9 and 11, causing the solenoid operators to switch positions of the respective application and release electro-magnet valves. The release electro-magnet valve R is thus closed and the application electro-magnet valve A opens to conduct compressed air from supply reservoir SR to relay valve RV, which is accordingly piloted to its application position in a well-known manner. In application position, relay valve RV conducts compressed air from supply reservoir SR to brake cylinder BC. Pressure transducer T1 provides feedback information to microprocessor MPU corresponding to the instantaneous brake cylinder pressure.

When the desired brake cylinder pressure is reached, wire 9 is de-energized to drop out the solenoid of application magnet valve A, which is accordingly spring-returned to its closed position to cut off further supply of air to the control port of relay valve RV. This in turn causes relay valve RV to terminate further buildup of brake cylinder pressure, by reason of an internal feedback loop that is subject to the effective brake cylinder pressure, thereby effecting a lap condition of the brakes.

When release of the brake application is desired, microprocessor unit MPU de-energizes wires 9 and 11, causing both of the electro-magnet valves A and R to assume the positions shown, in which supply reservoir pressure is cut-off from the relay valve control port, which is concurrently vented to atmosphere via release magnet valve R. This in turn causes relay valve RV to move to its release position in which the application pressure effective in brake cylinder BC is exhausted via pipe 19 and the relay valve exhaust port.

Figure 2A:
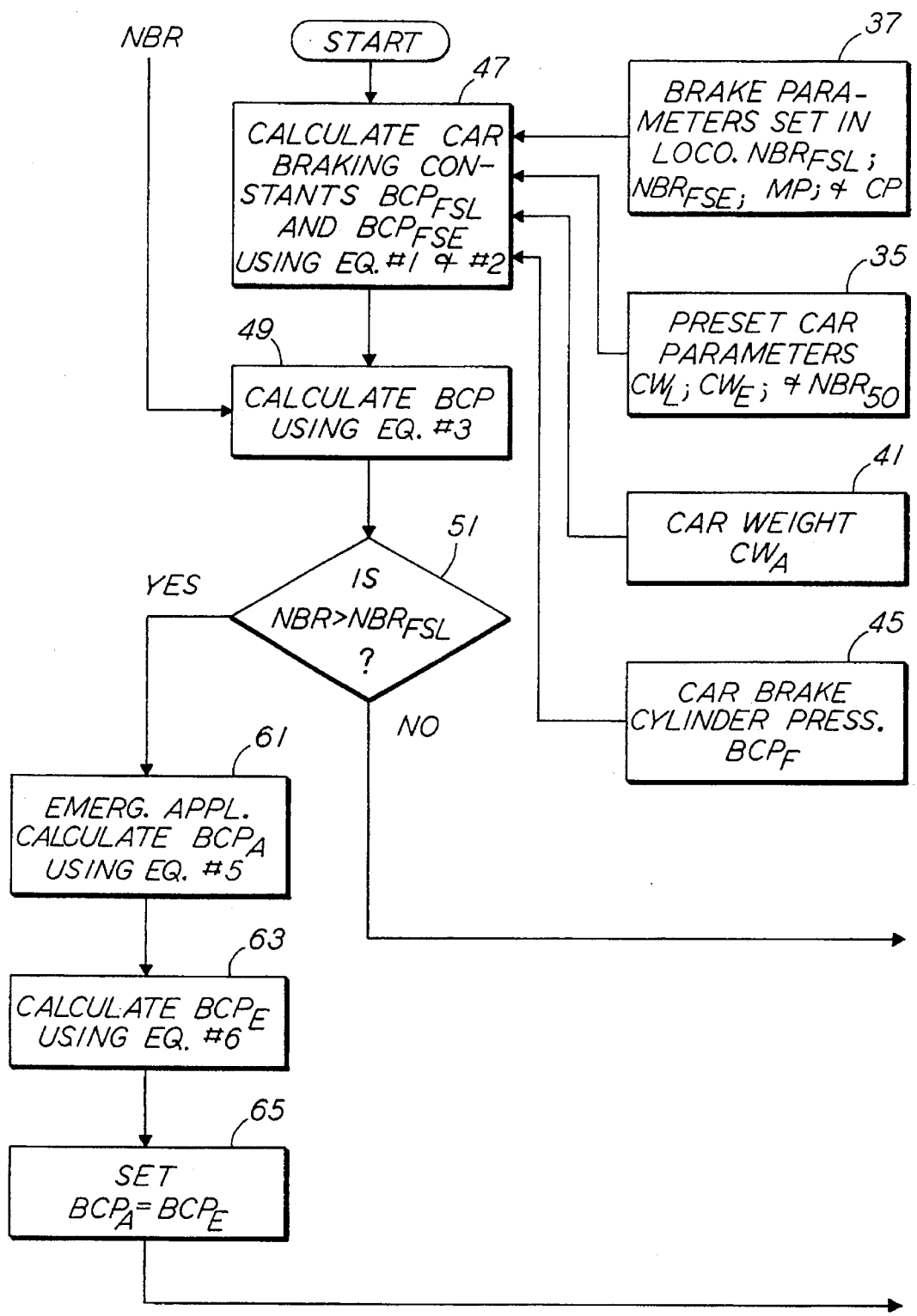
FIGS. 2A and 2B are a flow chart depicting the operating functions and sequence of operation of the microprocessor of FIG. 1.
Figure 2B:
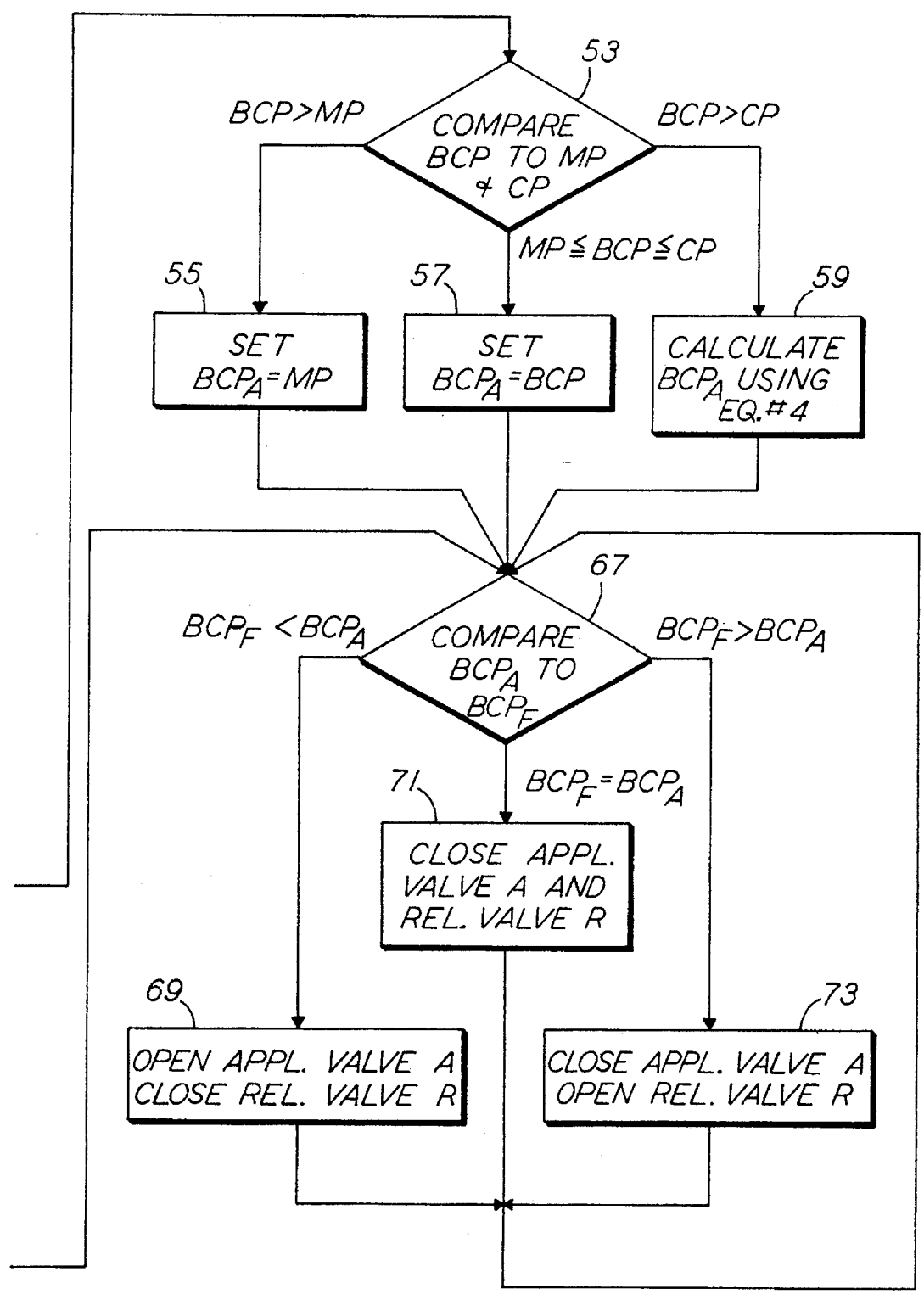

In accordance with the present invention, the operation of microprocessor unit MPU will now be explained following the flow chart of FIG. 2. The car parameters 31 input to microprocessor unit MPU and represented by block 35 include such fixed values as the rated maximum load weight $CW_L$, for which the car is designed, the empty car weight $CW_E$, and the cars designed net braking ratio $NBR_{50}$, which reflects the braking force capable of being achieved when a car operating at its full load capacity is braked with 50 psi brake cylinder pressure. In conventional equalization type brake systems, as is well known, 50 psi brake cylinder pressure corresponds to a full service brake application on a car having a brake pipe charged to 70 psi.

Figure 3:
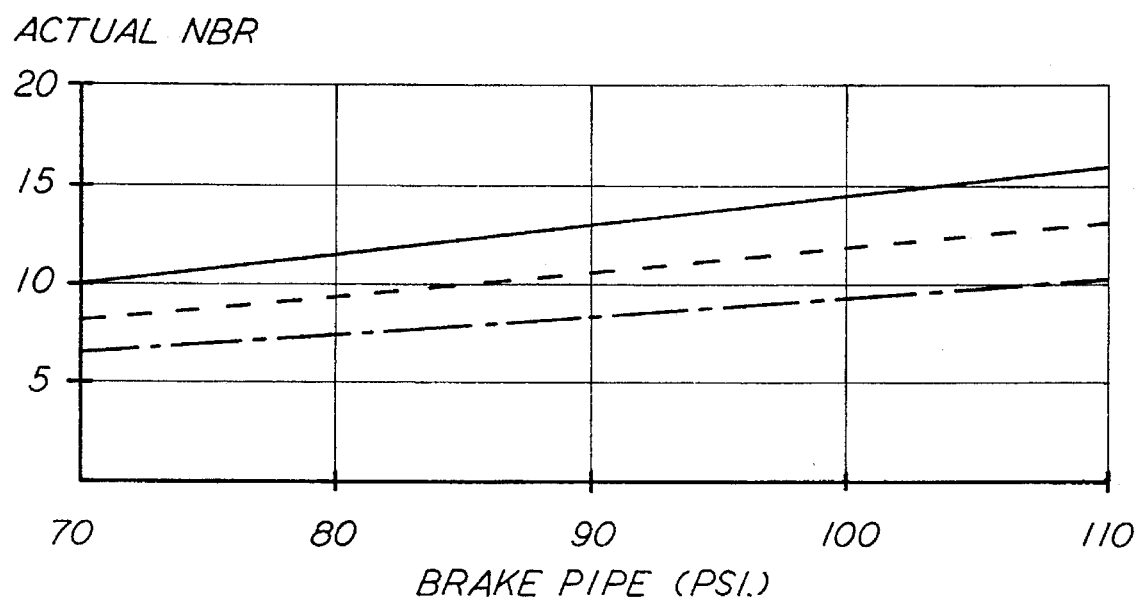
FIG. 3 is a graph showing how the net braking ratio on a car with a given design net braking ratio varies with different brake pipe pressures.

A block 37 represents such additional fixed parameters 33 as are set in the locomotive and input to each car microprocessor unit MPU. These parameters include the fully loaded car net braking ratio for a full service brake application $NBR_{FSL}$, the empty car net braking ratio for a full service brake application $NBR_{FSE}$, a load control changeover pressure CP, and a minimum brake application pressure MP. The respective changeover pressure CP and minimum application pressure MP are preselected fixed values representing the desired pressure at which modulation of a less than fully load car brake pressure is initiated and the desired minimum service brake pressure. A maximum value corresponding to $NBR_{FSE}$ has been established by the Association of American Railroads depending upon the material of the brake shoes and the style of brake rigging employed on a particular car. A value corresponding to $NBR_{FSL}$ may be determined in accordance with the brake pipe pressure at which a train is to be operated (graph of FIG. 3). Determining the value at which this parameter $NBR_{FSL}$ is to be set is based on operating experience, the terrain over which the train will travel, and the composition of the train itself, i.e., the number and type of cars, brake equipment, etc. Thus, determining the value of parameter $NBR_{FSL}$ is similar to determining at what value the brake pipe pressure should be charged in a train in which the cars are equipped with brakes operating on the conventional pressure equalization principle. In general, as higher levels of train braking effort are required, higher levels of brake pipe pressure are selected. FIG. 3 may be referenced as an aid in determining the value of parameter $NBR_{FSL}$. For instance, if a train made up of cars with a net braking ratio $NBR_{50}$ of 8.25 percent would normally be operated at 90 psi brake pipe pressure, this would result in a service equalization brake cylinder pressure of 64 psi in a conventional equalization type brake system. Referring to the chart of FIG. 3, it can be seen that the intersection of the 90 brake pipe coordinate with the 8.25 percent net braking ratio curve correlates with a net braking ratio NBR of 10.6 percent. Therefore, to obtain comparable braking in the present system as is obtained with the conventional equalization type brake system, the net braking ratio parameter $NBR_{FSL}$ should be set at 10.6 percent.

In addition to the aforementioned fixed parameters 31 and 33 input to microprocessor MPU, there is a variable input 29 that reflects the actual car weight $CW_A$, as represented by block 41; and a variable input that reflects a brake cylinder pressure feedback signal $BCP_F$, as represented by block 45.

Having the aforementioned signals available, the functional directive of block 47 is to calculate the full service brake cylinder pressure for a full loaded car and for an empty car based on a preselected net braking ratio and the car load condition according to equations (1) and (2) as follows:

$$BCP_{FSL} = \left(\frac{50}{NBR_{50}}\right) NBR_{FSL} \qquad (1)$$

$$BCP_{FSE} = \left(\frac{50}{NBR_{50}}\right) NBR_{FSE} \left(\frac{CW_E}{CW_L}\right) \qquad (2)$$

At this point, microprocessor unit MPU calculates the car brake cylinder pressure BCP based on equation (3), as follows:

$$BCP = \left(\frac{50}{NBR_{50}}\right) NBR \qquad (3)$$

Figure 4:
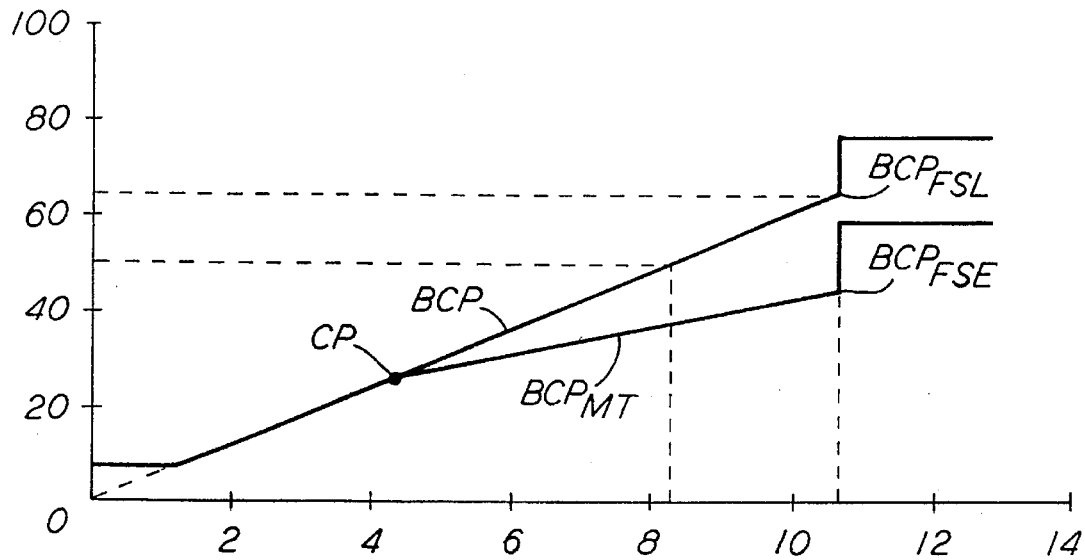
FIG. 4 is a graph showing a brake cylinder pressure versus net braking ratio curve for a car having a given design net braking ratio.

The resultant brake cylinder pressure BCP calculated by microprocessor MPU is shown in the graph of FIG. 4 by line BCP.

The program next progresses to decision block 51 where the commanded net braking ratio NBR from the locomotive is compared to signal $NBR_{FSL}$ set in block 47. If NBR is less than or equal to $NBR_{FSL}$, the program progresses to decision block 53 where the calculated brake cylinder pressure BCP is compared to the preselected minimum brake cylinder pressure MP and to the preselected changeover pressure CP. These parameters are indicated in the graph of FIG. 4 by points MP and CP on the brake cylinder pressure line BCP.

If the brake cylinder pressure signal BCP is less than the preselected minimum pressure MP, such discrepancy is recognized at block 55, which outputs an actual brake cylinder pressure signal $BCP_A$ corresponding to the preselected minimum brake cylinder pressure MP.

If the brake cylinder pressure BCP is greater than or equal to the minimum brake cylinder pressure signal MP but less than or equal to the changeover pressure CP, this condition is recognized by block 57, which outputs an actual brake cylinder pressure signal $BCP_A$ corresponding to the brake cylinder pressure BCP.

If the brake cylinder pressure BCP is greater than the changeover pressure CP, this condition is recognized by block 59, which calculates a load adjusted brake cylinder pressure $BCP_{LA}$ based on an equation (4), as follows:

$$BCP_{LA} = CP + (BCP_{FSE} - CP) + (BCP_{FSL} - BCP_{FSE})\frac{(CW_A - CW_E)}{(CW_L - CW_E)} \frac{(BCP - CP)}{(BCP_{FSL} - CP)} \qquad (4)$$

Returning now to decision block 51, if the commanded net braking ratio NBR is greater than the $NBR_{FSL}$, the program progresses to block 61 where an emergency brake application command is recognized and an actual brake cylinder pressure $BCP_A$ is calculated according to an equation (5), as follows:

$$BCP_A = CP + (BCP_{FSE} - CP) + (BCP_{FSL} - BCP_{FSE})\frac{(CW_A - CW_E)}{(CW_L - CW_E)} \qquad (5)$$

It will be noted that equation (5) differs from equation (4) only in the absence of the last term of equation (4).

The output $BCP_A$ of block 61 then passes to block 63, which calculates an emergency brake cylinder pressure $BCP_E$, based on equation (6), as follows:

$$BCP_E = K (BCP_A) \qquad (6)$$

where

K=a constant of 1.2 set by the American Association of Railroads as a percentage by which the emergency brake cylinder pressure should exceed the full service brake cylinder pressure.

This value of $BCP_E$ is then passed to block 65, which outputs an actual brake cylinder pressure signal $BCP_A$ corresponding to $BCP_E$.

At this point, another decision block 67 compares the actual brake cylinder pressure $BCP_A$ issued by the active one of the aforementioned blocks 55, 57, 59 or 65 with a feedback signal $BCP_F$ at block 45 corresponding to the effective pressure at brake cylinder BC, as sensed by transducer T1 in FIG. 1.

If the brake cylinder pressure feedback $BCP_F$ is less than the desired actual brake cylinder pressure $BCP_A$, a block 69 establishes control of the application and release electromagnet valves A, R via microprocessor wires 9 and 11. This results in the application electro-magnet valve A being opened and the release electro-magnet valve R being closed to effect an increase in the effective brake cylinder pressure as heretofore explained with reference to FIG. 1.

If the brake cylinder pressure feedback $BCP_F$ is greater than the desired actual brake cylinder pressure $BCP_A$, a block 73 establishes control of the application and release electro-magnet valves A, R via microprocessor wires 9 and 11. This results in the application electro-magnet valve A being closed and the release electro-magnet valve R being opened to effect a decrease in the effective brake cylinder pressure.

In the event the brake cylinder pressure feedback $BCP_F$ corresponds to the desired actual brake cylinder pressure $BCP_A$, within some pre-established tolerance, a block 71 establishes control of wires 9 and 11 to effect closure of both of the application and release electro-magnet valves A, R such that no further change in brake cylinder pressure occurs until such time as either the brake cylinder pressure feedback signal $BCP_F$ or the brake command signal NBR changes.

In accordance with the foregoing, the actual required brake cylinder pressure $BCP_A$ effective on any given car of a railroad train is regulated by its microprocessor unit MPU to provide a level of car retardation consistent with any other car in the train irrespective of such differences in the car design net braking ratio and/or car load weight as would otherwise influence such retardation.

Derivation of such a regulated brake cylinder pressure $BCP_A$ will now be explained for an exemplary railroad car analytically in accordance with the flow chart of FIG. 2 and graphically with reference to the graph of FIG. 4. This exemplary car may be assumed to exhibit the following preset parameters that are input to the car microprocessor MPU:

$NBR_{50}$=8.25%
$CW_L$=263,100 lbs.
$CW_E$=63,000 lbs.
$CW_A$=163,000 lbs.; and the braking parameters set in the locomotive are as follows:
$NBR_{FSL}$=10.6% (From graph of FIG. 3 based on 90 psi brake cylinder pressure.)
$NBR_{FSE}$=30.0%
CP=25 psi
MP=8 psi Assuming a constant lever ratio and rigging efficiency, the full service brake cylinder pressure $BCP_{FSL}$ for this exemplary car when fully loaded may be found from equation (1), as follows:

$$BCP_{FSL} = \left(\frac{50}{NBR_{50}}\right) NBR_{FSL} \qquad (1)$$

$$BCP_{FSL} = \frac{50}{8.25} \times 10.6$$

$$BCP_{FSL} = 64.24 \text{ psi}$$

Similarly, the full service brake cylinder pressure for this same car when completely empty may be found from equation (2), as follows:

$$BCP_{FSE} = \left(\frac{50}{NBR_{50}}\right)(NBR_{FSE})\left(\frac{CW_E}{CW_L}\right) \qquad (2)$$

$$BCP_{FSE} = \frac{50}{8.25} \times 30 \times \frac{63,000}{263,000}$$

$$BCP_{FSE} = 43.6 \text{ psi}$$

The foregoing calculations are represented by block 47 of the flow chart and are used to plot the curve of FIG. 4. The slope of a line BCP representing the full load brake cylinder pressure is found by connecting the point where the 50 psi brake cylinder pressure coordinate intersects the 8.25 net braking ratio coordinate, and connecting this point with the intersection of the X-Y axis. The point $BCP_{FSL}$ where this line BCP crosses the 10.6 net braking ratio coordinate $NBR_{FSL}$ corresponds to 64.2 psi brake cylinder pressure, the same as calculated by equation (1).

At point CP, which represents the changeover pressure at which an empty car is braked, the car brake cylinder pressure curve assumes a different slope, being connected by a line $BCP_{MT}$ to a point $BCP_{FSE}$ corresponding to the full service brake cylinder pressure for an empty car of 43.6 psi., the same as calculated by equation (2).

Assuming now that a brake command NBR of 3 is issued via wire 1, microprocessor MPU employs equation #3 to calculate the brake cylinder pressure BCP, as follows:

$$BCP = \left(\frac{50}{NBR_{50}}\right) NBR$$

$$BCP = \frac{(50)}{(8.25)} \, 3$$

$$BCP = 18.2 \text{ psi}$$

In that the commanded net braking ratio NBR is less than the net braking ratio for a full service load car $NBR_{FSL}$, as calculated at block 47 of the flow chart, the brake cylinder pressure BCP calculated at block 49 is compared with preset parameters MP and CP at block 53. Since the calculated brake cylinder pressure BCP of 18.2 psi is greater than the preset minimum brake application pressure MP of 8 psi and less than the changeover pressure CP of 25 psi, block 57 is activated to set the actual brake cylinder pressure $BCP_A$ at 18.2 psi.

Graphically, the actual required brake cylinder pressure $BCP_A$ is found from the intersection of the coordinate that corresponds to an NBR value of 3 with line BCP, which corresponds to 18.2 psi. brake cylinder pressure BCP, which is greater than the assumed minimum brake cylinder pressure MP and less than the changeover pressure CP. Therefore, the actual brake cylinder pressure $BCP_A$ is not further adjusted and remains at 18.2 psi.

Assuming that a brake command NBR of 8 is issued via wire 1, microprocessor MPU employs equation #3 to calculate the brake cylinder pressure BCP, as follows:

$$BCP = \left(\frac{50}{NBR_{50}}\right) NBR$$

$$BCP = \frac{(50)}{(8.25)} \, 8$$

$$BCP = 48.5 \text{ psi}$$

In that the commanded net braking ratio NBR is less than the net braking ratio for a full service load car $NBR_{FSL}$, the brake cylinder pressure BCP calculated at block 49 is compared with preset parameters MP and CP at block 53.

Since the calculated brake cylinder pressure of 48.5 psi is greater than the changeover pressure CP of 25 psi, block 59 is activated to load modulate brake cylinder pressure BCP in accordance with equation #4, as follows:

$$BCP_A = CP + (BCP_{FSE} - CP) + (BCP_{FSL} - BCP_{FSE}) \frac{(CW_A - CW_E)}{(CW_L - CW_E)} \frac{(BCP - CP)}{(BCP_{FSE} - CP)}$$

$$BCP_A = 25 + (43.6 - 25) + (64.24 - 43.6) \frac{(163,000 - 63,000)}{(263,000 - 63,000)} \frac{48.5 - 25}{64.24 - 25}$$

$$BCP_A = 25 + [18.6 + (20.64 \times .5)].6$$

$$BCP_A = 42.4 \text{ psi}$$

Graphically, the actual required brake cylinder pressure $BCP_A$ is found to lie on the coordinate that corresponds to an NBR value of 8 at a location between its intersection with the lines BCP and $BCP_{MT}$, depending upon the actual car load weight between full load $CW_L$ and empty $CW_E$. Under the assumed parameters of car loading, this exemplary car is 50% loaded, such being derived from the expression $$\frac{(CW_A - CW_E)}{(CW_L - CW_E)}$$

used in equations (4) and (5). Thus, by finding a point midway between the intersection of the 8.25 coordinate with curve BCP (corresponding to 50 psi brake cylinder pressure) and with curve $BCP_{MT}$ (corresponding to 34.6 psi), the actual required brake cylinder pressure $BCP_A$ is found to be 42.3 psi.

While this adjustment for weight, as accomplished by equation 4, will result in NBR values which are not constant throughout the train it will allow empty or partially loaded cars to share in the braking of the train. This is especially useful during grade braking.

Assuming now that the commanded net brake ratio NBR is recognized as being greater than the full service net brake ratio $NBR_{FSL}$, microprocessor MPU calculates an adjusted brake cylinder pressure $BCP_A$ using equation (5), as directed by function block 61:

$$BCP_A = CP + (BCP_{FSE} - CP) + (BCP_{FSL} - BCP_{FSE}) \frac{(CW_A - CW_E)}{(CW_L - CW_E)}$$

$$BCP_A = 25 + (43.6 - 25) + (64.24 - 43.6) \frac{(163,000 - 63,000)}{(263,000 - 63,000)}$$

$$BCP_A = 25 + 18.6 + (20.64 \times .5)$$

$$BCP_A = 53.92 \text{ psi}$$

The actual brake cylinder pressure $BCP_A$ calculated by equation (5) is further adjusted in accordance with equation (6), as indicated at function block 63 to obtain the emergency brake cylinder pressure $BCP_E$. As previously noted, this emergency brake cylinder pressure $BCP_E$ is greater than the adjusted $BCP_A$ by a predetermined fixed value, such as 1.2 set by the Association of American Railroads. Therefore, using equation 6, the load modified emergency brake cylinder pressure is calculated as follows:

$$BCP_E = K(BCP_A)$$

$$BCP_E = 1.2 \times 53.92 \text{ or } 64.7 \text{ psi}$$

In that the value $BCP_A$ is adjusted according to the car load condition, it will be appreciated that the value $BCP_E$ also reflects car load.

From the foregoing, it will be appreciated that the brake pipe pressure must be sufficiently high to supply enough brake cylinder pressure for an emergency application in accordance with the selected net braking ratio parameter $NBR_{FSL}$. Since the brake pipe BP in the present system is used to supply air to the brake cylinder via check valve 7 and supply reservoir SR, the minimum level of brake pipe pressure required to provide the desired emergency level of brake cylinder pressure, as well as all levels of service brake cylinder pressure, therefore corresponds to the maximum emergency brake cylinder pressure for a fully loaded car. This can be calculated in accordance with equation (7), as follows:

$$BCP_{EMER} = \frac{(50)}{(NBR_{50})} NBR_{FSL} \times K \qquad (7)$$

where:

$BCP_{EMER}$=emergency brake cylinder pressure for a full load car;

$NBR_{FSL}$=the selected parameter for a full service application on a full load car; and

K=1.2

Substituting values in the foregoing example in equation (7) yields:

$$BCP_{EMER} = \frac{50}{8.25} \times 10.6 \times 1.2 \text{ or } 84.7 \text{ psi}$$

Therefore the minimum required brake pipe pressure must be high enough so that equalization between the supply reservoir SR and the brake cylinder, with connecting piping, results in at least a value equal to $BCP_{EMER}$, in this example 84.7 psi.

Figure 5:
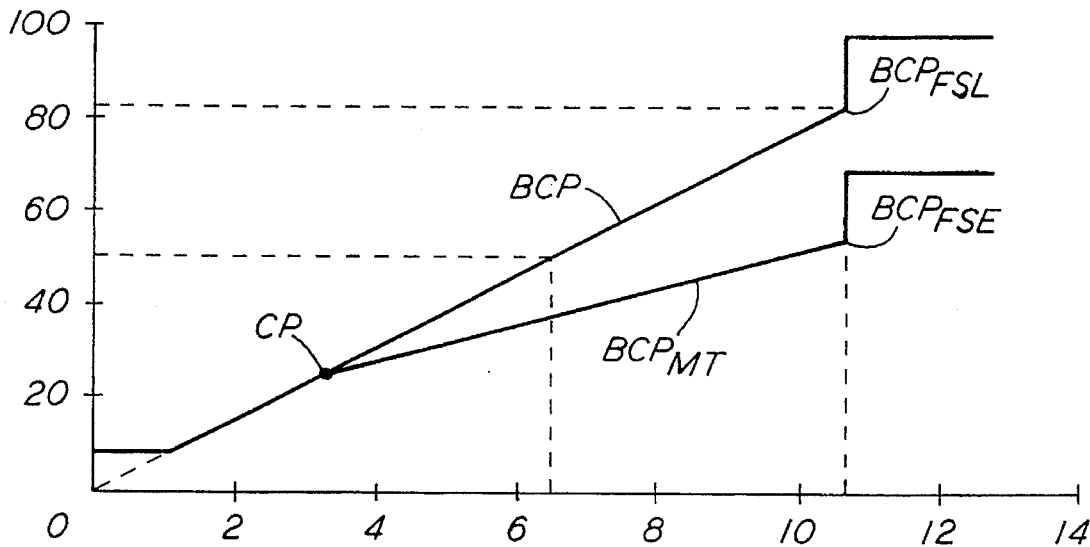
FIG. 5 is a graph similar to that of FIG. 4 for a car having a different design net braking ratio.

While the above discussion is concerned with how the actual brake cylinder pressure $BCP_A$ is regulated in accordance with different brake commands NBR for a car having a design net braking ratio $NBR_{50}$ of 8.25, and for the actual car load condition, it will be appreciated that for a given brake command NBR, the actual brake pressure $BCP_A$ will differ on a car having a different design net braking ratio, operating in the same train as the first car, and given the same parameters as assumed with respect to the first car. For example, the brake cylinder pressure BCP versus net braking ratio NBR curve for such an exemplary car having a design net braking ratio $NBR_{50}$ of 6.5 is shown in the graph of FIG. 5. Comparing the graph of FIG. 5 with the graph of FIG. 4, it is seen that the slope of the lines BCP and $BCP_{MT}$ is steeper in FIG. 5. Consequently the actual brake cylinder pressure $BCP_A$ realized for such a car having a design net braking ratio of 6.5 is greater than for a car having a design net braking ratio of 8.25 for any given brake command NBR.

It will be appreciated, therefore, that the brake cylinder pressure on each car of a train can be regulated in accordance with the present invention to provide a consistent level of retardation irrespective of such differences in design net braking ratio and/or load weight as influence such retardation. It is recognized and accounted for by this invention that especially for grade braking, it is desirable to increase the level of braking for partially loaded or empty cars. This results in higher NBR levels on partially loaded or empty cars than on fully loaded cars.

I claim:

1. A microprocessor based brake control system on board a railroad car having a designed net braking ratio predicated on a predetermined brake pressure and a predetermined load weight of said railroad car, said brake control system comprising:

a) means for receiving a command signal representing a desired net braking ratio of said railroad car;

b) a source of fluid under pressure;

c) a fluid pressure operated brake device for effecting retardation of said railroad car;

d) valve means for controlling fluid pressure communication of said brake device with said source and with the atmosphere;

e) transducer means for providing a feedback signal $BCP_F$ corresponding to the fluid pressure effective at said brake device;

f) a microprocessor for providing a brake pressure signal BCP that differs from said predetermined brake pressure in proportion to the difference between said command signal and said designed net braking ratio; and g) said feedback signal $BCP_F$ being connected to said microprocessor which operates said valve means when said brake pressure signal BCP deviates from said feedback signal $BCP_F$ in a manner to bring said feedback signal into general equality with said brake pressure signal.

2. A brake control system as recited in claim 1, wherein said predetermined brake pressure is approximately 50 psi.

3. A brake control system as recited in claim 1, wherein said predetermined load weight is the rated maximum load weight of said railroad car.

4. A brake system as recited in claim 1, wherein an $NBR_{50}$ signal and a NBR signal are connected to said microprocessor which calculates a brake pressure signal BCP in accordance with the following equation:

$$BCP = \left( \frac{50}{NBR_{50}} \right) NBR,$$

where said $NBR_{50}$ signal corresponds to said design net braking ratio of said railroad car and said NBR signal is said command signal.

5. A brake system as recited in claim 4, wherein a predetermined minimum brake pressure signal MP is connected to said microprocessor which establishes an actual brake pressure signal $BCP_A$ equal to the value of said signal MP when said brake pressure signal BCP is less than said minimum brake pressure signal MP.

6. A brake system as recited in claim 5, wherein a predetermined empty/load changeover signal CP is connected to said microprocessor which establishes said actual brake pressure signal $BCP_A$ generally equal to said brake pressure signal BCP when said brake pressure signal BCP is greater than said minimum brake pressure signal MP and lesser than said changeover brake pressure signal CP.

7. A brake system as recited in claim 4, wherein a signal $NBR_{FSL}$ is further connected to said microprocessor which establishes a full service brake pressure signal $BCP_{FSL}$ in accordance with the following equation:

$$BCP_{FSL} = \left( \frac{50}{NBR_{50}} \right) NBR_{FSL}$$

where said signal $NBR_{FSL}$ is a first predetermined net braking ratio corresponding to a full service brake application on said railroad car in a full load condition thereof.

8. A brake control system as recited in claim 7, wherein a load signal $CW_E$, a load signal $CW_L$, and a signal $NBR_{FSE}$ are further connected to said microprocessor, which calculates a full service brake pressure signal $BCP_{FSE}$ for an empty condition of said railroad car in accordance with the following equation:

$$BCP_{FSE} = \left(\frac{50}{NBR_{50}}\right) NBR_{FSE} \left(\frac{CW_E}{CW_L}\right)$$

where said signal $CW_E$ is the weight of said railroad car in an empty condition and said signal $CW_L$ is the weight of said railroad car in a full load condition.

9. A brake control system as recited in claim 8, wherein a predetermined empty/load changeover signal CP, and a weight signal $CW_A$ are further connected to said microprocessor which calculates a load adjusted brake pressure signal $BCP_A$, when said brake pressure signal BCP is greater than said changeover signal CP, in accordance with the following equation:

$$BCP_A + CP + (BCP_{FSE} - CP) + (BCP_{FSL} - BCP_{FSE}) \frac{(CW_A - CW_E)}{(CW_L - CW_E)} \frac{(BCP - CP)}{(BCP_{FSL} - CP)}$$

where said changeover signal CP is the load weight of said railroad car above which a load condition is deemed to exist and below which an empty condition is deemed to exist, and said weight signal $CW_A$ is the actual load weight of said railroad car.

10. A brake control system as recited in claim 9, wherein said microprocessor calculates an emergency brake pressure signal $BCP_E$ when said command signal NBR is greater than said full service net braking ratio signal $NBR_{FSL}$ in accordance with the following equation:

$$BCP_E = CP + (BCP_{FSE} - CP) + (BCP_{FSL} - BCP_{FSE}) \frac{(CW_A - CW_E)}{(CW_L - CW_E)}$$

11. A brake control system as recited in claim 10, wherein said emergency brake pressure signal $BCP_E$ is a predetermined percentage greater than said load adjusted brake pressure signal $BCP_{LA}$.

12. For operation on board a railroad freight car having a designed net braking ratio predicated on a predetermined brake pressure and a predetermined load weight, a microprocessor comprising:
 a) means for receiving a command signal NBR representing a desired net braking ratio of said railroad car;
 b) means for receiving a net braking ratio signal $NBR_{50}$ representing the designed net braking ratio of said railroad car;
 c) means for calculating a brake pressure signal BCP that differs from a predetermined brake pressure, on which said designed net braking ratio of said railroad car is based, an amount proportional to the difference between said command signal NBR and said designed net braking ratio.

13. For operation on board a railroad freight car having a designed net braking ratio predicated on a predetermined brake pressure and a predetermined load weight, a microprocessor comprising:
 a) first means for generating a brake pressure signal that varies with a command signal corresponding to a desired net braking ratio of said railroad car;
 b) second means for establishing a minimum value of said brake pressure signal;
 c) third means for load adjusting said brake pressure signal in accordance with the actual load weight of said railroad car when said brake pressure signal exceeds a predetermined empty/load changeover point; and
 d) fourth means for limiting the maximum value of said load adjusted brake pressure signal at a value corresponding to a predetermined full service net braking ratio.

14. A microprocessor as recited in claim 13, wherein the ratio of said brake pressure signal to said command signal is proportional to the ratio of a predetermined brake pressure to the designed net braking ratio of said railroad car based on said predetermined brake pressure.

15. A microprocessor as recited in claim 14, further comprising fifth means for generating an emergency brake pressure signal that exceeds the maximum value of said load adjusted brake pressure signal by a predetermined amount when said command signal exceeds said predetermined full service braking ratio.

16. A method of controlling a microprocessor based brake system on board a railroad car having a designed net braking ratio predicated on a predetermined brake pressure and a predetermined load weight of said railroad car, said brake control system comprising the steps of:
 a) receiving an electric command signal representing a desired net braking ratio of said railroad car;
 b) computing a brake pressure signal that differs from said predetermined brake pressure in proportion to the difference between said command signal and said designed net braking ratio;
 c) comparing said brake pressure signal with a feedback signal corresponding to the fluid pressure of a brake device of said railroad car; and
 d) controlling the supply and release of the fluid under pressure of said brake device when said brake pressure signal deviates from said feedback signal.

17. The method recited in claim 16, wherein said brake pressure signal is computed in accordance with the following equation:

$$BCP = \left(\frac{50}{NBR_{50}}\right) NBR$$

where $50/NBR_{50}$ is the ratio of a predetermined brake pressure to a net braking ratio based on such predetermined brake pressure, and NBR is said command signal.

18. The method recited in claim 16 comprising the further steps of:
 a) comparing said brake pressure signal with a predetermined minimum value thereof; and
 b) adjusting said brake pressure signal to said minimum value when said brake pressure signal is less than said minimum value.

19. The method recited in claim 16 comprising the further steps of:
 a) comparing said brake pressure signal with a predetermined empty/load changeover pressure; and
 b) adjusting said brake pressure signal in accordance with the actual load weight of said railroad car when said brake pressure signal exceeds said changeover pressure.

20. The method recited in claim 19, wherein said brake pressure signal is adjusted in accordance with the following equations:

$$BCP_{FSL} = \left(\frac{50}{NBR_{50}}\right) NBR_{FSL} \qquad (1)$$

where $BCP_{FSL}$ is the full service brake pressure when said railroad car is in a fully load condition; $50/NBR_{50}$ is the ratio of a predetermined brake pressure to a net braking ratio based on such predetermined brake pressure; and $NBR_{FSL}$ is a first predetermined net braking ratio corresponding to a full service brake application;

$$BCP_{FSE} = \left(\frac{50}{NBR_{50}}\right) NBR_{FSE} \left(\frac{CW_E}{CW_L}\right) \quad (2)$$

where $BCP_{FSE}$ is the full service brake pressure when said railroad car is empty; $CW_E$ is the empty weight of said railroad car; and $CW_L$ is the full load weight of said railroad car; and $$BCP_A = CP + (BCP_{FSE} - CP) + (BCP_{FSL} - BCP_{FSE}) \frac{(CW_A - CW_E)}{(CW_L - CW_E)} \frac{(BCP - CP)}{(BCP_{FSL} - CP)} \quad (3)$$

where $CW_A$ is the actual load weight of said railroad car; and CP is said empty/load changeover pressure.

21. The method recited in claim 16 further comprising the steps of:
    a) comparing said command signal with said predetermined full service braking ratio; and
    b) adjusting said brake pressure signal when said command signal exceeds said predetermined full service braking ratio.

22. The method recited in claim 21, wherein said brake pressure signal is adjusted in accordance with the following equations:

$$BCP_{FSL} = \left(\frac{50}{NBR_{50}}\right) NBR_{FSL} \quad (1)$$

where $BCP_{FSL}$ is the full service brake pressure when said railroad car is in a fully load condition; $50/NBR_{50}$ is the ratio of a predetermined brake pressure to a net braking ratio based on such predetermined brake pressure; and $NBR_{FSL}$ is a first predetermined net braking ratio corresponding to a full service application;

$$BCP_{FSE} = \left(\frac{50}{NBR_{50}}\right) NBR_{FSE} \left(\frac{CW_E}{CW_L}\right) \quad (2)$$

where $BCP_{FSE}$ is the full service brake pressure when said railroad car is empty; $CW_E$ is the empty weight of said railroad car; and $CW_L$ is the full load weight of said railroad car; and $$BCP_A = CP + (BCP_{FSE} - CP) + (BCP_{FSL} - BCP_{FSE}) \frac{(CW_A - CW_E)}{(CW_L - CW_E)} \quad (3)$$

where $CW_A$ is the actual load weight of said railroad car; and CP is said empty/load changeover pressure.

\* \* \* \* \*